US009203535B2

(12) United States Patent
Chang et al.

(10) Patent No.: US 9,203,535 B2
(45) Date of Patent: Dec. 1, 2015

(54) CONFIGURABLE, HIGHLY-INTEGRATED SATELLITE RECEIVER

(71) Applicant: MaxLinear, Inc., Carlsbad, CA (US)

(72) Inventors: Glenn Chang, Carlsbad, CA (US); Raja Pullela, Irvine, CA (US); Madhukar Reddy, Carlsbad, CA (US); Timothy Gallagher, Encinitas, CA (US); Shanta Murthy Prem Swaroop, Irvine, CA (US); Curtis Ling, Carlsbad, CA (US); Vamsi Paidi, Irvine, CA (US); Wenjian Chen, Irvine, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 13/783,130

(22) Filed: Mar. 1, 2013

(65) Prior Publication Data

US 2013/0230078 A1 Sep. 5, 2013

Related U.S. Application Data

(63) Continuation-in-part of application No. 13/356,265, filed on Jan. 23, 2012, now Pat. No. 8,725,104.

(60) Provisional application No. 61/606,137, filed on Mar. 2, 2012, provisional application No. 61/569,731, filed on Dec. 12, 2011.

(51) Int. Cl.
H04H 40/90 (2008.01)

(52) U.S. Cl.
CPC .................... *H04H 40/90* (2013.01)

(58) Field of Classification Search
CPC ....... H04H 20/74; H04H 20/80; H04H 20/90; H04H 40/90; H04N 7/00; H04N 7/20
See application file for complete search history.

(56) References Cited

U.S. PATENT DOCUMENTS

| 6,356,539 | B1 | 3/2002 | Zuliani | |
|---|---|---|---|---|
| 6,819,274 | B2 * | 11/2004 | Krone et al. | 341/141 |
| 8,345,798 | B2 * | 1/2013 | Petrovic et al. | 375/316 |
| 8,644,427 | B2 * | 2/2014 | Porret et al. | 375/340 |
| 2003/0112895 | A1 | 6/2003 | Cook et al. | |
| 2006/0083335 | A1 | 4/2006 | Seendripu et al. | |
| 2007/0082603 | A1 | 4/2007 | Norin et al. | |
| 2009/0290659 | A1 | 11/2009 | Petrovic et al. | |
| 2010/0023972 | A1 | 1/2010 | Summers et al. | |
| 2011/0105068 | A1 | 5/2011 | Reddy et al. | |
| 2013/0147521 | A1 * | 6/2013 | Ling | 327/98 |

OTHER PUBLICATIONS

Int'l Search Report and Written Opinion for PCT/US2013/028860 dated May 28, 2013.

* cited by examiner

*Primary Examiner* — Leon Flores
(74) *Attorney, Agent, or Firm* — McAndrews, Held & Malloy, Ltd.

(57) ABSTRACT

A direct broadcast satellite (DBS) reception assembly may comprise an integrated circuit that is configurable between or among a plurality of configurations based on content requested by client devices served by the DBS reception assembly. In a first configuration, multiple satellite frequency bands may be digitized by the integrated circuit as a single wideband signal. In a second configuration, the satellite frequency bands may be digitized by the integrated circuit as a plurality of separate narrowband signals. The integrated circuit may comprise a plurality of receive paths, each of the receive chains comprising a respective one of a plurality of low noise amplifiers and a plurality of analog-to-digital converters.

6 Claims, 8 Drawing Sheets

(12)  US 9,203,535 B2

CONFIGURABLE, HIGHLY-INTEGRATED SATELLITE RECEIVER

CLAIM OF PRIORITY

This patent application makes reference to, claims priority to and claims benefit from U.S. Provisional Patent Application Ser. No. 61/606,137 filed on Mar. 2, 2012. This application is also a continuation-in-part of U.S. application Ser. No. 13/356,285 which was filed Jan. 23, 2012, issued on May 13, 2014 as U.S. Pat. No. 8,725,104, and which claims priority to and benefit from U.S. Provisional Patent Application 61/569,731 filed on Dec. 12, 2011.

The above-identified application is hereby incorporated herein by reference in its entirety.

FIELD OF THE INVENTION

Certain embodiments of the invention relate to communication systems. More specifically, certain embodiments of the invention relate to methods and systems for a configurable, highly-integrated Satellite receiver.

BACKGROUND OF THE INVENTION

Existing methods and systems for satellite reception can be costly and inflexible. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Systems and methods are provided for a configurable, highly integrated satellite receiver, substantially as shown in and/or described in connection with at least one of the figures and/or the appendices, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1A:
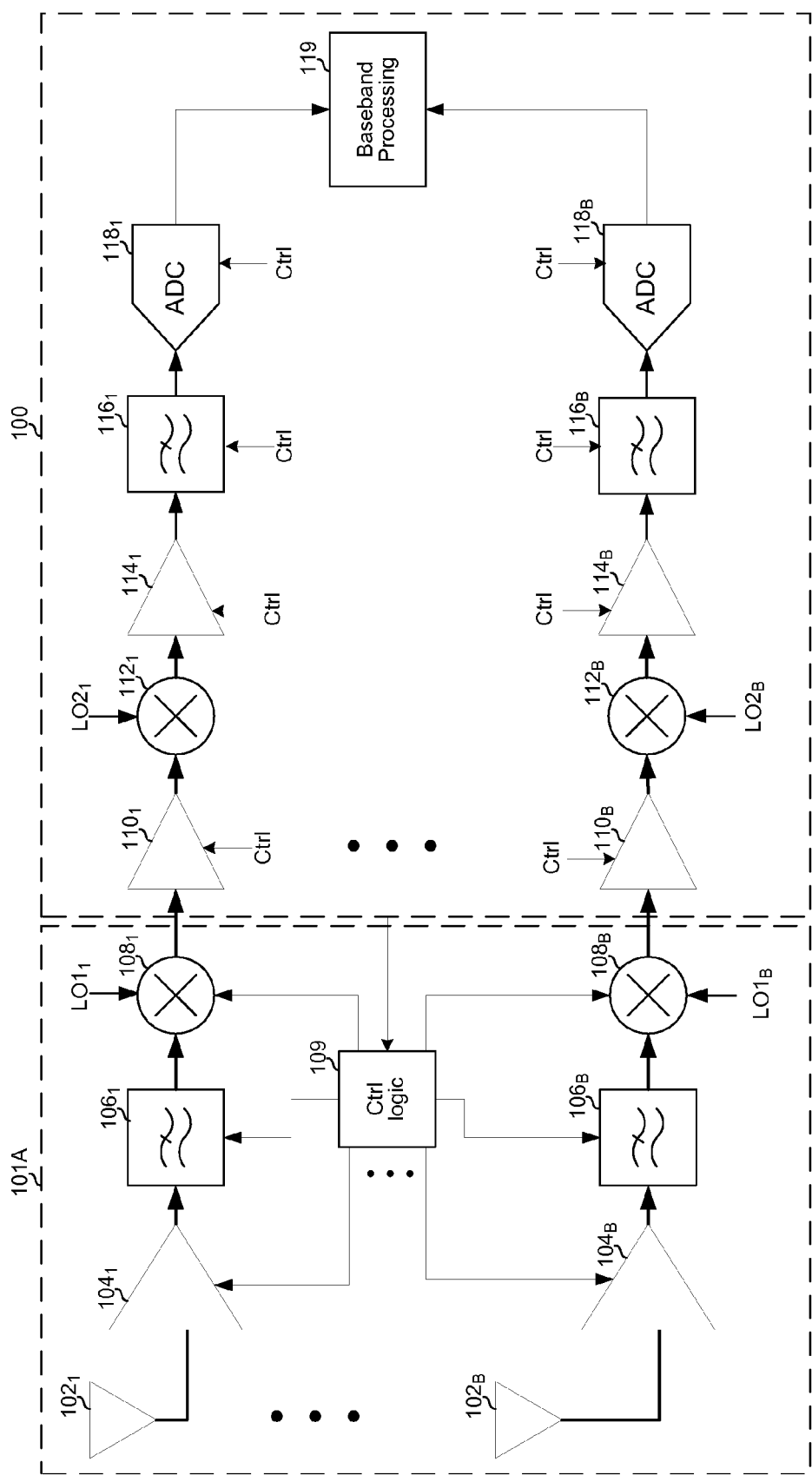
FIG. 1A depicts circuitry of a first example satellite reception assembly.

FIG. 1A depicts circuitry of a first example satellite reception assembly. Shown in FIG. 1A are a first example subsystem 101A and a second example subsystem 100. In an example implementation, the second subsystem 100 may be integrated on a first semiconductor die and the subsystem 101A may comprise one or more second semiconductor dice and/or one or more discrete components. That is, components of the subsystem 101A may be "off-chip" with respect to the subsystem 100.

The example subsystem 101A comprises a plurality of antennas $102_1$-$102_B$, a plurality of amplifiers $104_1$-$104_B$, a plurality of filters $106_1$-$106_B$, a plurality of mixers $108_1$-$108_B$, and a control logic circuit 109, where B is an integer corresponding to the number of receive chains in the subsystem 100.

Each of the antennas 102 may be configured to capture signals of one or more polarizations in one or more of a plurality of satellite frequency bands. For example, each of the antennas may be configured to capture one or more of: horizontally-polarized signals in a X/Ku low band (e.g., ~10.7 GHz to ~11.7 GHz), vertically-polarized signals in an X/Ku low band (e.g., ~10.7 GHz to ~11.7 GHz), horizontally-polarized signals in a Ku high band (e.g., ~11.7 GHz to ~12.75 GHz), vertically-polarized signals in a Ku high band (e.g., ~11.7 GHz to ~12.75 GHz), horizontally-polarized signals in a Ka low band (e.g., ~17.3 GHz to ~17.7 GHz), vertically-polarized signals in a Ka low band (e.g., ~17.3 GHz to ~17.7 GHz), horizontally-polarized signals in a Ka low band (e.g., ~18.3 GHz to ~18.8 GHz), vertically-polarized signals in a Ka low band (e.g., ~18.3 GHz to ~18.8 GHz), horizontally-polarized signals in a Ka high band (e.g., ~19.7 GHz to ~20.2 GHz), vertically-polarized signals in a Ku high band (e.g., ~19.7 GHz to ~20.2 GHz). As used herein "low" band and "high" band are relative words. Accordingly, a band labeled as "low" in one implementation may be labeled as "high" in another implementation.

Each of the amplifiers 104 may be a low noise amplifier (LNA) operable to apply a gain to satellite signals captured by a corresponding antenna. In an example implementation, each of the amplifiers 104 may be realized using p-type high electron mobility transistors (PHEMT) and may have a ~1 dB noise figure (NF). In an example implementation, one or more of the amplifiers 104 may be enabled and disabled (e.g., by connecting and disconnecting a supply voltage) via a control signal from the control logic 109. In an example implementation, a bandwidth, center frequency, and/or gain of one or more of the amplifiers 104 may be controlled via a control signal from the control logic 109.

Each of the filters 106 may be an image reject filter configured to pass only a selected one or more satellite frequency bands to a corresponding mixer while rejecting signals outside the selected one or more satellite frequency bands. In an example implementation, one or more of the filters 106 may be enabled and disabled (e.g., by connecting and disconnecting a supply voltage) via a control signal from control logic 109. In an example implementation, the bandwidth and/or center frequency of one or more of the filters 106 may be configurable via a control signal from the control logic 109.

Each of the mixers 108 may be configured to downconvert a satellite frequency band to an intermediate frequency band (e.g., downconvert one or more X, Ku, and/or Ka satellite frequency bands to L-band). In an example implementation, one or more of the mixers 108 may be enabled and disabled (e.g., by connecting and disconnecting a supply voltage) via a control signal from control logic 109. In an example implementation, a frequency of the local oscillator signal LO1 input to a particular one of the mixers 108 may be determined by a control signal from the control logic 109. For example, LO1 may be set to a first frequency for downconversion of a first one or more satellite bands (e.g., a X/Ku low band), a second frequency for downconversion of a second one or more satellite bands (e.g., a Ku high band), a third frequency for downconversion of a third one or more satellite bands (e.g., both a X/Ku low band and a Ku high band), a fourth frequency for downconversion of a fourth one or more satellite bands (e.g., a Ka low band), a fifth frequency for downconversion of a fifth one or more satellite bands (e.g., a Ka high band), and a sixth frequency for downconversion of a sixth one or more satellite bands (e.g., both a Ka low band and a Ka high band). In an example implementation, for downconversion of a first satellite band, LO1 may be approximately 9.75 GHz when downconverting a X/Ku low band to output an intermediate frequency band of approximately 0.95-1.95 GHz, and LO1 may be 10.6 GHz when downconverting a Ku high band to output an intermediate frequency band of approximately 1.1-2.15 GHz. In another example implementation, LO1 may be 10.4 GHz or 13.05 GHz when downconverting European Full Ku-band signals from 10.7 GHz to 12.75 GHz to output an intermediate frequency band of approximately 300 MHz to 2350 MHz. In an example implementation, one or more of the mixers may be a Ka-band mixer with a 42 dB gain, a 7 dB NF, and a −31.6 dBc integrated phase noise (PN). For example, a mixer 108 may be a TFF 1017HN/N1 NXP Ka Band Mixer.

In an example implementation, the control logic 109 may configure the control signals it generates for components of the subsystem 101A based on information received from the subsystem 100 (e.g., from baseband processing circuit 119). For example, the subsystem 100 may convey information as to which channels are to be provided to client devices (e.g., set-top boxes) served by a Direct Broadcast Satellite (DBS) and/or Fixed Satellite Service (FSS) satellite reception assembly in which the subsystems 101A and 100 reside. In an example implementation, the control logic 109 may provide supply power to components of the subassembly 101A and/or 100 through positive and negative power rails, for example. The control logic 109 may, for example, provide temperature-compensated current and voltage biases. The control logic 109 may generate supply voltages based on an external DC supply such as power-over-Ethernet (POE), for example. Moreover, the control logic 109 may be operable to generate digital satellite equipment control version 1.1 (DiSEqC 1.1) compliant voltages (e.g., 13-18 Volts). The control logic 109 may be operable to provide voltages for other DiSEqC versions as well.

The example subsystem 100 comprises a plurality of amplifiers $110_1$-$110_B$, a plurality of mixers $112_1$-$112_B$, a plurality of amplifiers $114_1$-$114_B$, a plurality of filters $116_1$-$116_B$, a plurality of analog-to-digital converters 118, and a baseband processing circuit 119, where B is an integer corresponding to the number of receive chains in the subsystem 100.

Each of the plurality of amplifiers $110_1$-$110_B$ may be a low noise amplifier (LNA). In an example implementation, one or more of the amplifiers 110 may be enabled and disabled (e.g., by connecting and disconnecting a supply voltage) via a control signal from, for example, the baseband processing circuit 119. In an example implementation, a bandwidth, center frequency, and/or gain of one or more of the amplifiers 110 may be controlled via a control signal from, for example the baseband processing circuit 119.

Each of the plurality of mixers $112_1$-$112_B$ may be configured to downconvert an intermediate frequency band (e.g., in the L-band) to baseband. In an example implementation, one or more of the mixers 108 may be enabled and disabled (e.g., by connecting and disconnecting a supply voltage) via a control signal from, for example, the baseband processing circuit 119. In an example implementation, a frequency of the local oscillator signal LO2 input to a particular one of the mixers 112 may be determined by a control signal from, for example, the baseband processing circuit 119. The frequency of the LO2 signal for a particular one of the mixers may be determined based on which satellite frequency band the receive chain to which the particular mixer belongs has been configured to process. For example, there may be six frequencies for LO2 corresponding to six possible satellite bands (e.g., low band 1, high band 1, combined high band 1 and low band 1, low band 2, high band 2, and combined high band and low band 2). As another example, the frequency of LO2 may be fixed where the LO1 signals are selected to generate a common intermediate frequency band regardless of the selected satellite band. In an example implementation, each LO2 may be between approximately 0.3 GHz and approximately 2.3 GHz.

Each of the plurality of amplifiers $114_1$-$114_B$ may be a transimpedance amplifier. In an example implementation, one or more of the amplifiers 114 may be enabled and disabled (e.g., by connecting and disconnecting a supply voltage) via a control signal from, for example, the baseband processing circuit 119. In an example implementation, a gain of one or more of the amplifiers 114 may be determined by a control signal from, for example, the baseband processing circuit 119.

Each of the plurality of filters $116_1$-$116_B$ may be operable to select a desired band of frequencies to pass to a corresponding one of ADCs $118_1$-$118_B$ and reject other frequencies. In an example implementation, one or more of the filters 116 may be enabled and disabled (e.g., by connecting and disconnecting a supply voltage) via a control signal from, for example, the baseband processing circuit 119. In an example implementation, a bandwidth and/or center frequency of a passband of one or more of the filters 116 may be determined by a control signal from, for example, the baseband processing circuit 119. For example, a particular filter 116 may be configured to have a first passband when a receive chain to which the filter belongs is configured for processing a first satellite band (e.g., low band 1), to have a second passband when a receive chain to which the filter belongs is configured for processing a second satellite band (e.g., high band 1), to have a third passband when a receive chain to which the filter belongs is configured for processing a third satellite band (e.g., both low band 1 and high band 1), to have a fourth passband when a receive chain to which the filter belongs is configured for processing a fourth satellite band (e.g., low band 2), to have a fifth passband when a receive to which the filter belongs is configured for processing a fifth satellite band (e.g., high band 2), and to have a sixth passband when a receive chain to which the filter belongs is configured for processing a sixth satellite band (e.g., both low band 2 and high band 2).

Each of the plurality of analog-to-digital converters $118_1$-$118_B$ may be operable to concurrently digitize the entirety of the baseband signal corresponding to the satellite band selected for processing the receive chain to which the ADC belongs. For example, each ADC 118 may be operable to concurrently digitize the entirety of a frequency band up to approximately 2 GHz wide.

The baseband processing circuit 119 may be operable to perform various digital signal processing operations such as, for example, synchronization/timing recovery, equalization, demapping, deinterleaving, image cancellation, forward error correction (FEC) decoding, frequency translation, and/or channelization. In an example implementation, the circuit 119 may comprise circuitry for generating signals for outputting (e.g., via a coaxial cable and/or wirelessly) received satellite data to a set-top box, or other indoor unit. An example baseband processor 119 is described below with reference to FIG. 3.

Figure 1B:
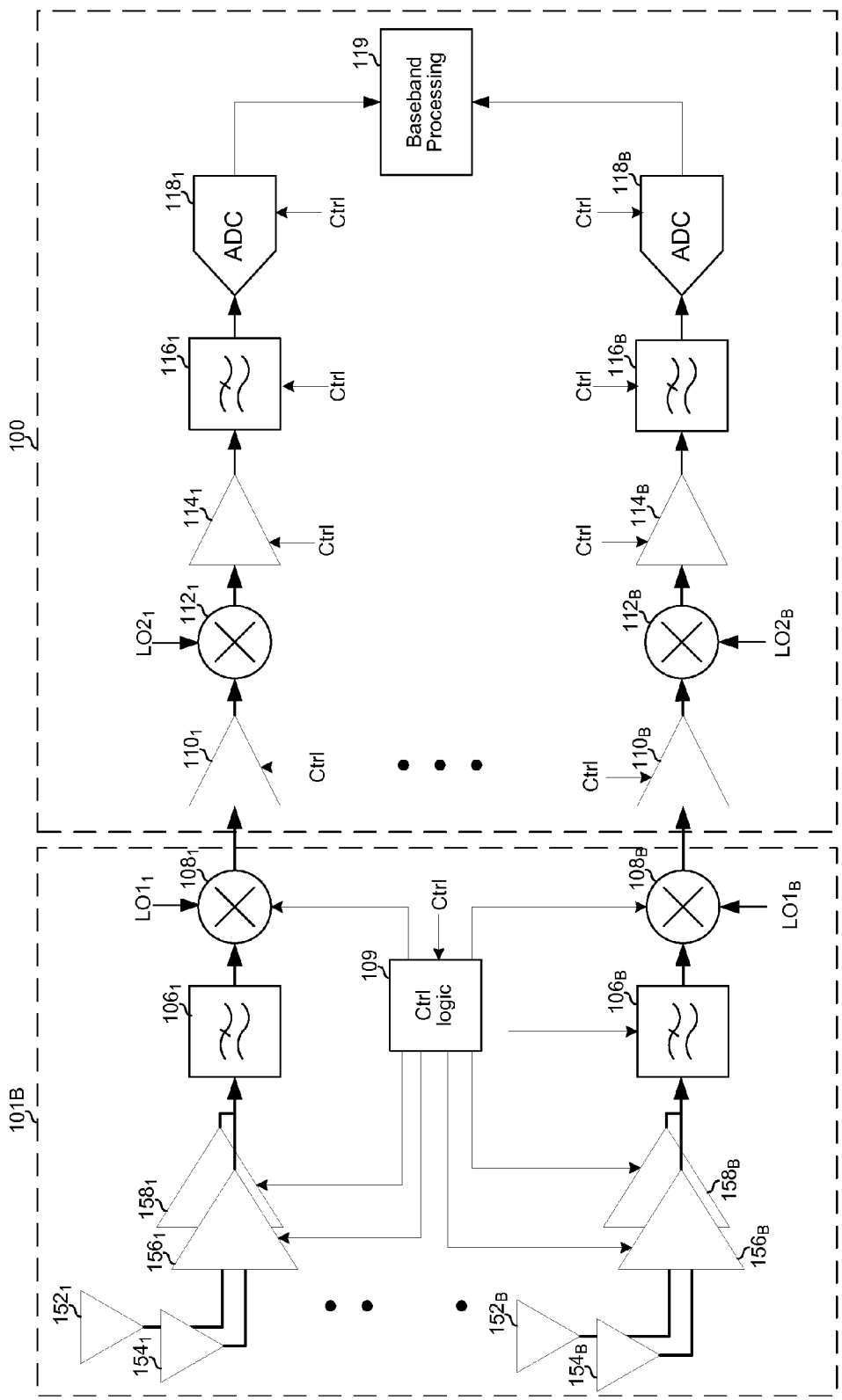
FIG. 1B depicts circuitry of a second example satellite reception assembly.

FIG. 1B depicts circuitry of a second example satellite reception assembly. Shown in FIG. 1B is a subsystem 101B and the subsystem 100.

The subsystem 101B may be similar to the subsystem 101A described above with reference to FIG. 1A. The subsystem 101B differs from the subsystem 101A in that each receive chain comprises multiple amplifiers 152 and 154 (each of which may be similar to or the same as each of the amplifiers 104) arranged in parallel, rather than a single amplifier 104. In this regard, the input to each filter 106 may comprise the combined output of a corresponding pair of amplifiers 152 and 154. In an example implementation, each amplifier 152 may be configured to amplify a first satellite band (e.g., low band 1) and each amplifier 154 may be configured to amplify a second satellite band (e.g., high band 1). Accordingly, using receive chain 1 as an example, selecting a first satellite band (e.g., low band 1) for processing by receive chain 1 may correspond to enabling amplifier $152_1$ and disabling amplifier $154_1$, selecting a second satellite band (e.g., high band 1) for processing by receive chain 1 may correspond to enabling amplifier $154_1$ and disabling amplifier $152_1$, and selecting a third satellite band (e.g., both low band 1 and high band 1) for processing by receive chain 1 may correspond to enabling both amplifier $152_1$ and amplifier $154_1$.

Figure 2A:
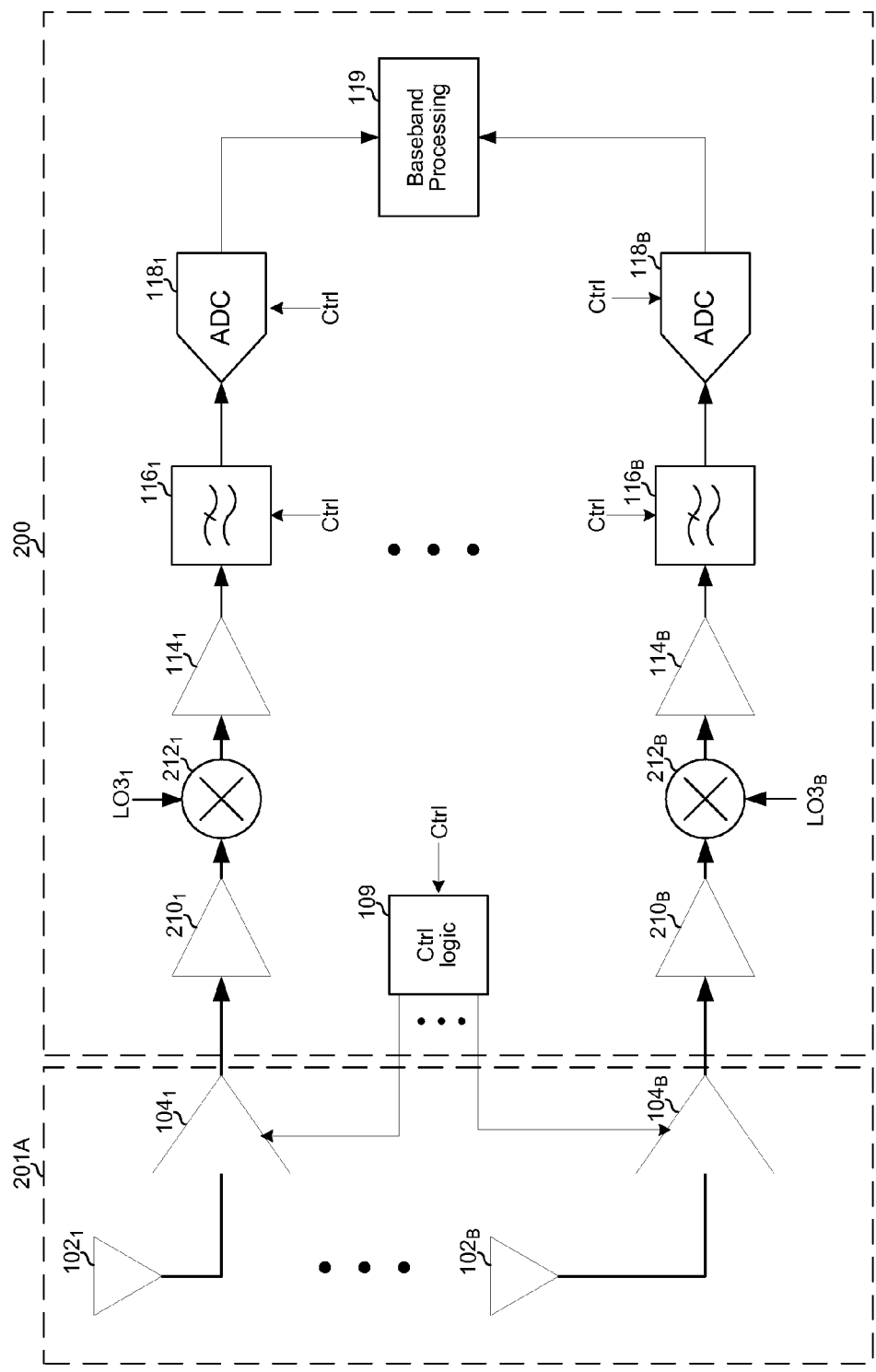
FIG. 2A depicts circuitry of a third example satellite reception assembly.

FIG. 2A depicts circuitry of a third example satellite reception assembly. Shown are a subassembly 201A and a subassembly 200. Like subassembly 101A of FIG. 1A, subassembly 201A comprises a plurality of the antennas $102_1$-$102_B$ and a plurality of amplifiers $104_1$-$104_B$. Unlike the subassembly 101A, the subassembly 201A does not comprise mixers $108_1$-$108_B$. Accordingly, the subassembly 201A is configured for interfacing to a direct conversion subassembly 200, which accepts satellite frequency input—as opposed to the subassembly 100 of FIGS. 1A and 1B which accepts intermediate frequency input.

The example subsystem 200 comprises a plurality of amplifiers $210_1$-$210_B$, a plurality of mixers $212_1$-$212_B$, a plurality of amplifiers $114_1$-$114_B$, a plurality of filters $116_1$-$116_B$, a plurality of analog-to-digital converters $118_1$-$118_B$, and a baseband processing circuit 119, where B is an integer corresponding to the number of receive chains of the subsystem 200.

The plurality of amplifiers $210_1$-$210_B$ may be similar to the amplifiers $110_1$-$110_B$ but may be configured for handling radio frequency signals in satellite frequency bands (e.g., X, Ku, K, and/or Ka band(s)) whereas the amplifiers $110_1$-$110_B$ may be configured to handle signals in an intermediate frequency band (e.g., L band).

The plurality of mixers $212_1$-$212_B$ may be similar to the mixers $112_1$-$112_B$ but may be configured for converting RF signals directly to baseband rather than converting IF signals to baseband. Accordingly, the local oscillator signals $LO3_1$-$LO3_B$ input to the $212_1$-$212_B$ may be, for example, substantially higher in frequency than the signals $LO2_1$-$LO2_B$.

Each of the plurality of amplifiers $114_1$-$114_B$, filters $116_1$-$116_B$, analog-to-digital converters $118_1$-$118_B$, and the baseband processing circuit 119 may be as described with reference to FIG. 1A.

Figure 2B:
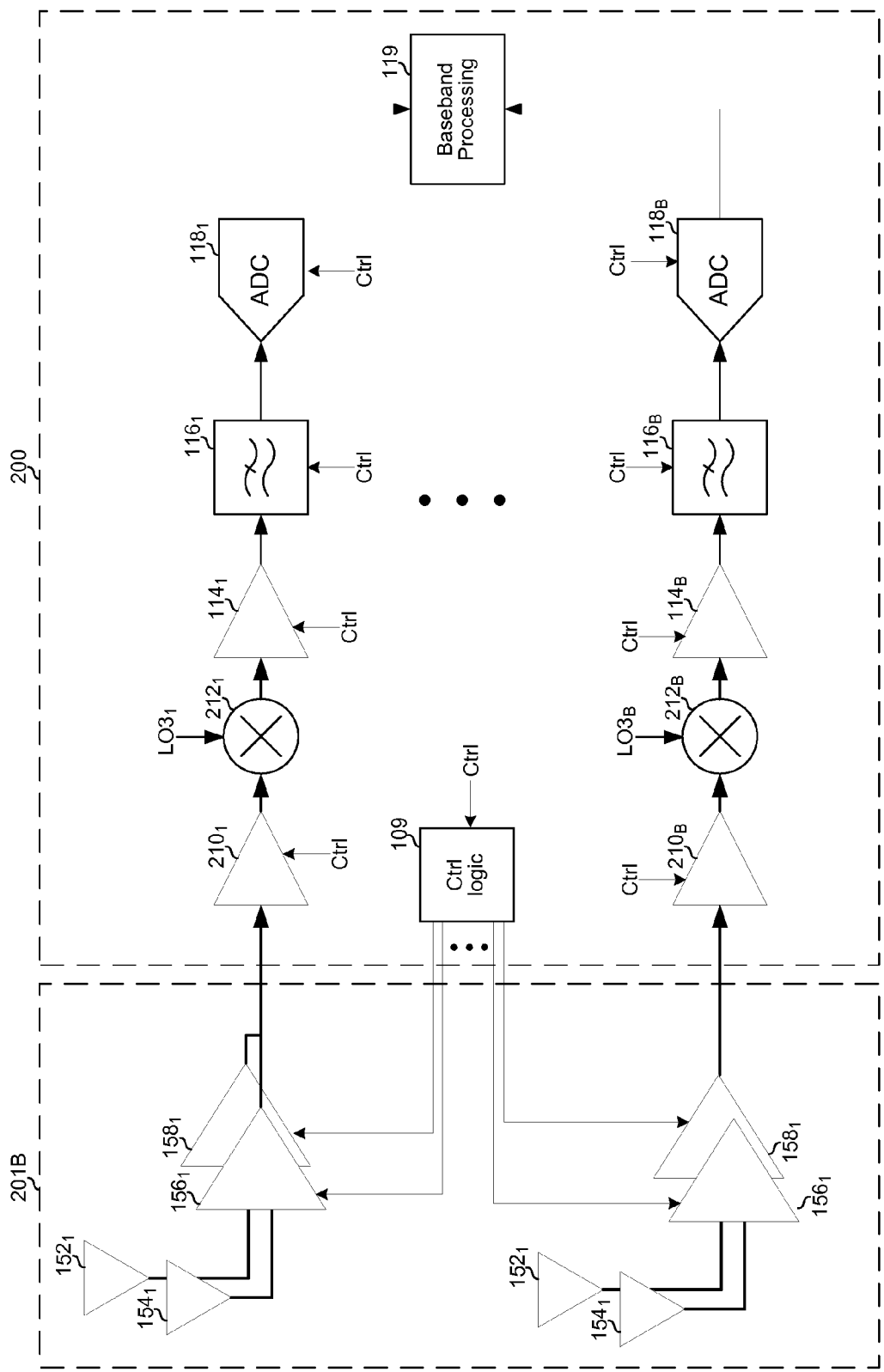
FIG. 2B depicts circuitry of a fourth example satellite reception assembly.

FIG. 2B depicts circuitry of a fourth example satellite reception assembly. The subsystem 201B may be similar to the subsystem 101B described above with reference to FIG. 1B. Like subassembly 101B of FIG. 1B, subassembly 201B comprises a plurality of the antennas $152_1$-$152_B$ and $154_1$-$154_B$ and a plurality of amplifiers $156_1$-$156_B$ and $158_1$-$158_B$. Unlike the subassembly 101B, the subassembly 201B does not comprise mixers $108_1$-$108_B$. Accordingly, the subassembly 201B is configured for interfacing to a direct conversion subassembly 200, which accepts satellite frequency input— as opposed to the subassembly 100 of FIGS. 1A and 1B which accepts intermediate frequency input.

Some of the advantages provided by the direct-conversion architectures shown in FIGS. 2A and 2B, over the IF architectures shown in FIGS. 1A and 1B, include the ability to eliminate one conversion step (e.g., mixer 108), which may reduce power consumption and circuit area. Another benefit may be, in instances where MoCA, terrestrial broadcast television, and/or other signals are combined with the satellite signal for input to the indoor unit, the downconversion to baseband may occur prior to such combining. This may relieve the front-end dynamic range requirements.

Although the control logic 109 is shown as part of subsystem 101A and 101B in FIGS. 1A and 1B, and part of subsystem 201A and 201B in FIGS. 2A and 2B, such implementations are only for purposes of illustration and not limitation.

Figure 3:
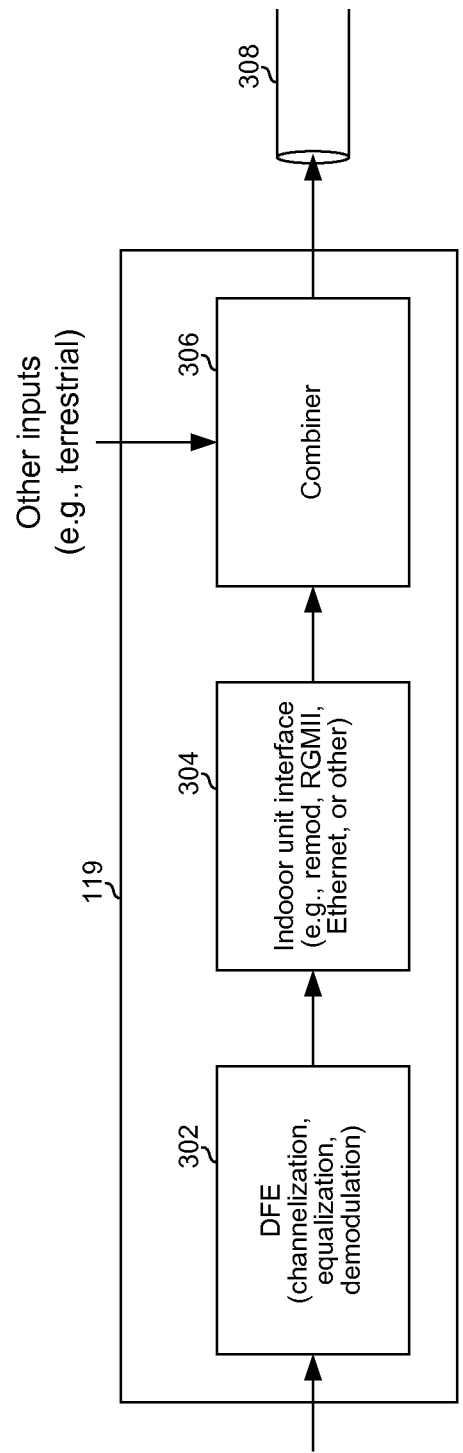
FIG. 3 depicts an example baseband processing circuit.

FIG. 3 depicts an example baseband processing circuit. The example baseband circuit 119 comprises digital front end (DFE) circuitry 302, circuitry 304 for interfacing to an indoor unit (e.g., set-top box) and circuitry 306 for combining an output of the satellite reception assembly with other signals (e.g., terrestrial broadcast television signals) for transmission to the indoor unit.

The DFE 302 may be operable to perform various digital signal processing operations on one or more signals output by one or more ADCs 118. The DFE 302 may be operable to channelize the signal(s) from the ADC(s) and demodulate a selected one or more of the channels to recover data stream(s) (e.g., MPEG transport streams) contained therein. Demodulation operations may include, for example, synchronization and timing recovery, equalization, symbol de-mapping, de-interleaving, and FEC decoding. The recovered data stream(s) may be conveyed to the circuitry 304 where it is processed for transmission to an indoor unit.

The circuitry 304 may be operable to process data received from the circuit 302 to generate signals suitable for transmission to an indoor unit. In an example implementation, the circuitry 304 may modulate the data onto one or more RF carriers in accordance with one or more standards (e.g., DVB-S, ATSC, etc.). In such an embodiment, the circuitry 304 may be operable to perform replication and/or frequency translation to perform band/channel stacking. In an example implementation, the circuitry 304 may process the data and transmit it to the indoor unit in accordance with a bus protocol such as USB, RGMII, PCIe, HDMI, or the like. In an example implementation, the circuitry 304 may packetize the data and transmit it to the indoor unit in accordance with, for example, the IEEE 802.3 family of standards, the IEEE 802.11 family of standards, multimedia over coax alliance (MoCA), and/or any other suitable networking protocols/standards.

In an example implementation, where the circuitry 304 outputs an RF modulated signal, circuitry 306 may be operable to combine the output of circuitry 304 with other RF signals. For example, satellite content output in a first frequency band by the circuitry 304 may be combined with signals of a second frequency band (e.g., terrestrial broadcast signals and/or MoCA signals). The combiner 306 may, for example, perform level adjustment of the various inputs prior to combining.

The output of the circuit 306 (or circuit 304 where 306 is not present) may be placed onto a communication medium (e.g., coaxial cable) that connects the satellite reception assembly to one or more indoor units.

Figure 4:
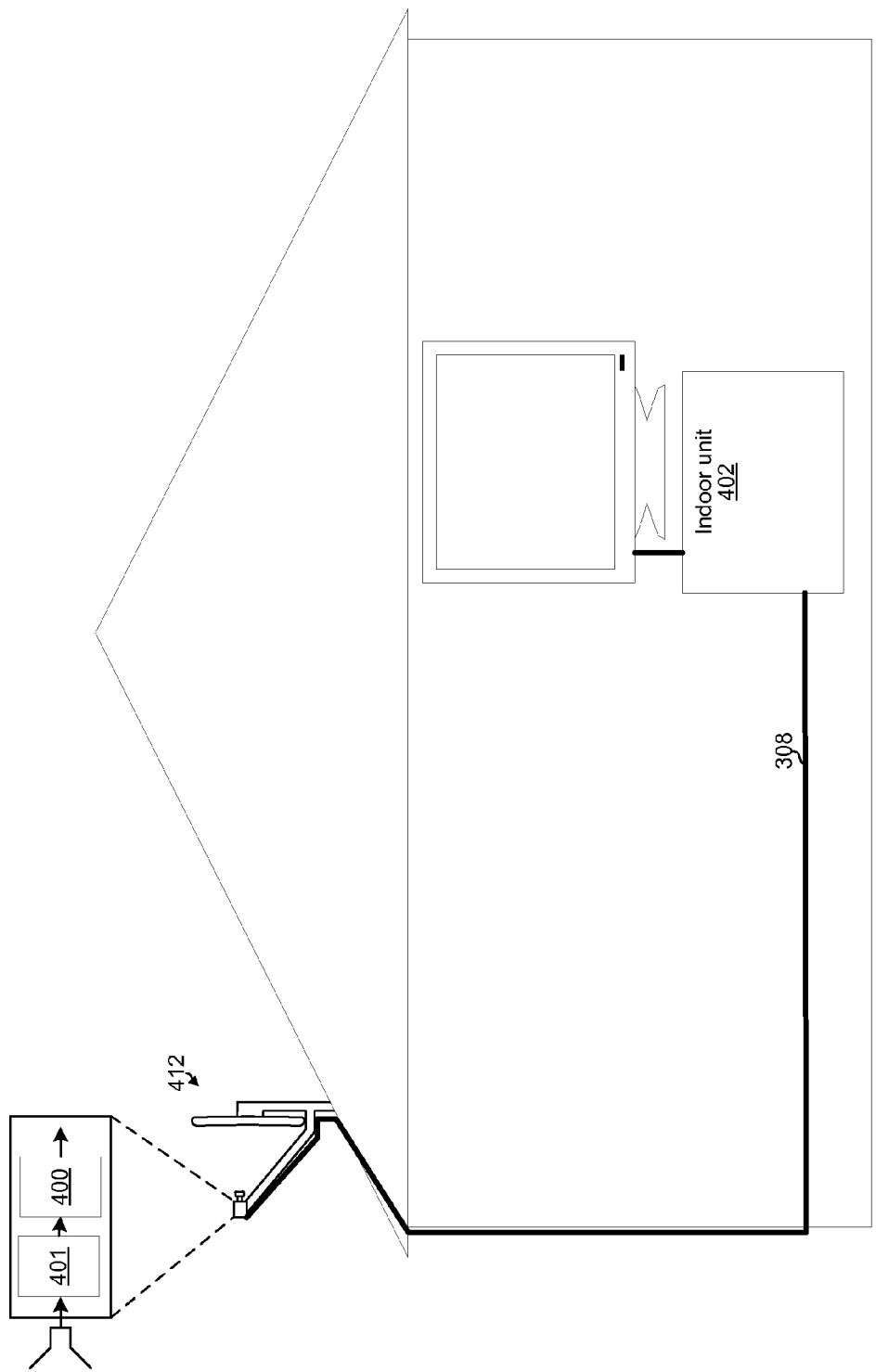
FIG. 4 depicts an example DBS subscriber installation.

FIG. 4 depicts an example DBS and/or FSS subscriber installation. Shown is a home or office of a DBS and/or FSS subscriber. A satellite reception assembly 412 is mounted to the exterior, an indoor unit is in the interior, and the two are connected via medium 308. The satellite reception assembly (e.g., a DBS/FSS "dish") 412 comprises a support structure to which are mounted a reflector and a receiver subassembly. The receiver subassembly comprises a subassembly 401, which may correspond to the subsystem 101A and/or 201A, and a subsystem 400, which may correspond to the subsystem 100 and/or 200. The receiver subassembly may be mounted to an arm or "boom" of the support structure such that one or more antennas 102, 152, and/or 154 (e.g., horn antennas) are mounted at or near a focal point of the reflector. The indoor unit 402 may comprise, for example, a set-top box, television, personal computer, or other client device configured to accept input in one or more formats output by the satellite reception assembly 412.

Figure 5:
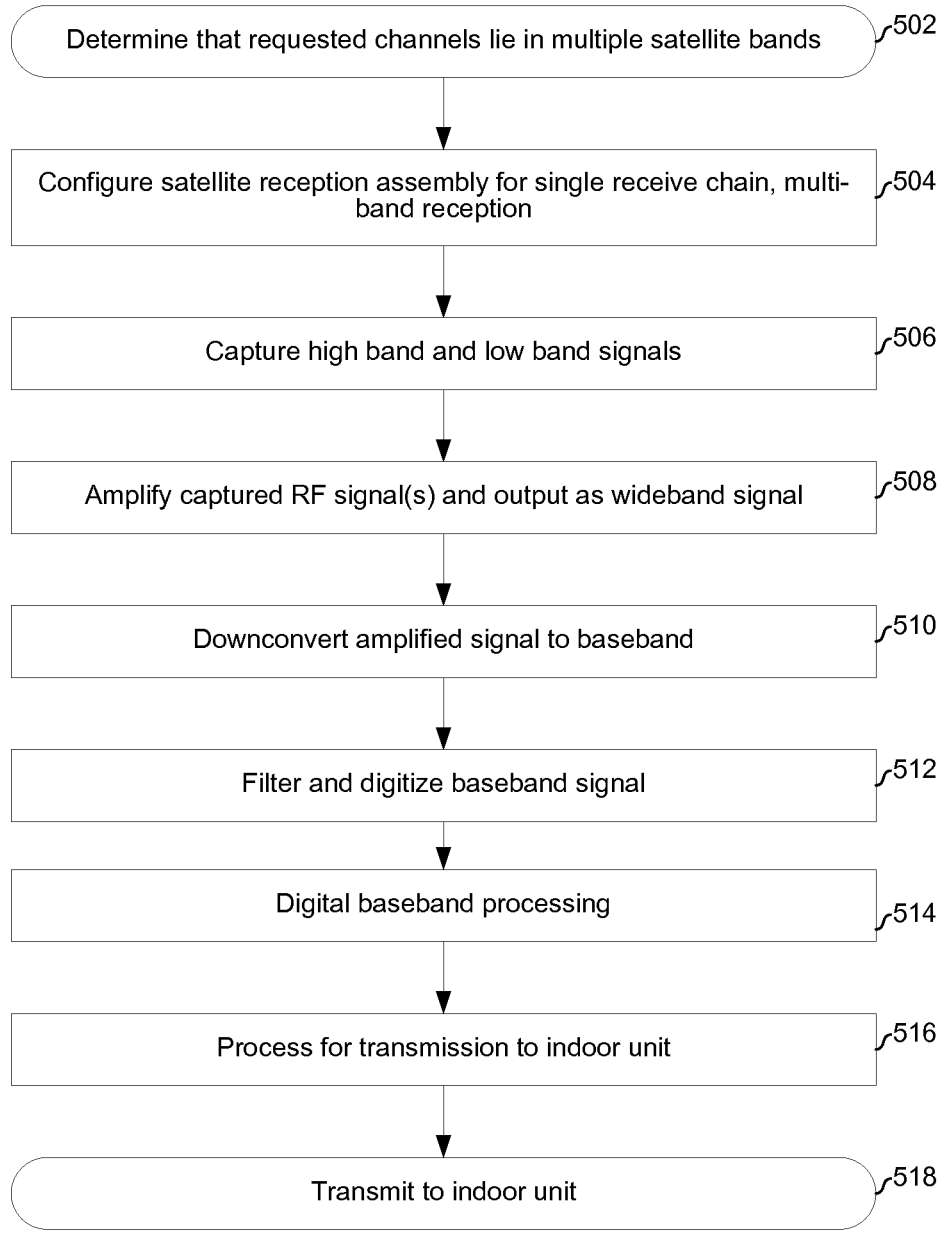
FIG. 5 is a flowchart depicting an example process of a configurable, highly-integrated satellite receiver.

FIG. 5 is a flowchart depicting an example process of a configurable, highly-integrated satellite receiver. The process begins with block 502 in which it is determined (e.g., by circuitry of the indoor unit 402 and/or circuitry of the satellite reception assembly 412) that channels being requested by client devices served by the satellite reception assembly 412 lie in multiple satellite bands. For example, it may be determined that one or more of the channels lies in low band 1 (e.g., X/Ku low band) and one or more of the channels lies in high band 1 (e.g., Ku high band).

In block 504, the satellite reception assembly 412 is configured to process the multiple satellite bands carrying the requested channels. In an example implementation, the satellite reception assembly is configured to process the multiple satellite bands via a single receive chain. For purposes of illustration, it is assumed receive chain 1 is selected for processing the multiple bands.

For the implementation shown in FIG. 1A, block 504 may comprise powering up amplifier $104_1$, filter $106_1$, mixer $108_1$, amplifier $110_1$, mixer $112_1$, amplifier $114_1$, filter $116_1$, and ADC $118_1$. Other components of other receive chains may, for example, be powered down if all requested channels are in the satellite bands to be processed by receive chain 1. Conversely, if the requested channels span more satellite bands than can be handled by a single receive chain, then components of additional receive chains may be powered up.

For the implementation shown in FIG. 1B, block 504 may comprise powering up amplifiers $156_1$ and $158_1$, filter $106_1$, mixer $108_1$, amplifier $110_1$, mixer $112_1$, amplifier $114_1$, filter $116_1$, and ADC $118_1$. Other components of other receive chains may, for example, be powered down if all requested channels are in the satellite bands to be processed by receive chain 1. Conversely, if the requested channels span more satellite bands than can be handled by a single receive chain, then components of additional receive chains may be powered up.

For the implementation shown in FIG. 2A, block 504 may comprise powering up amplifier $104_1$, amplifier $210_1$, mixer $212_1$, amplifier $114_1$, filter $116_1$, and ADC $118_1$. Other components of other receive chains may, for example, be powered down if all requested channels are in the satellite bands to be processed by receive chain 1. Conversely, if the requested channels span more satellite bands than can be handled by a single receive chain, then components of additional receive chains may be powered up.

For the implementation shown in FIG. 2B, block 504 may comprise powering up amplifiers $156_1$ and $158_1$, amplifier $210_1$, mixer $212_1$, amplifier $114_1$, filter $116_1$, and ADC $118_1$. Other components of other receive chains may, for example, be powered down if all requested channels are in the satellite bands to be processed by receive chain 1. Conversely, if the requested channels span more satellite bands than can be handled by a single receive chain, then components of additional receive chains may be powered up.

In block 506, energy of the multiple bands may be captured by the powered-up antenna $102_1$ (or antennas $152_1$ and $154_1$) and conveyed to amplifier $104_1$ (or amplifiers $156_1$ and $158_1$). In block 508, the captured signal(s) may be amplified by one or more amplifiers to generate an amplified wideband RF signal.

In block 510, the amplified wideband RF signal may be downconverted to baseband (e.g., in two stages as in FIGS. 1A and 1B, or in one stage as in FIGS. 2A and 2B). In block 512, the baseband signal may be filtered and digitized by filter $116_1$ and ADC $118_1$.

In block 514, digital baseband processing may be performed to recover one or more data streams. The digital baseband processing may comprise, for example, synchronization, equalization, channelization, de-mapping, de-interleaving, image cancellation, and FEC decoding.

In block 516, the data streams may be processed for transmission to an indoor unit. Such processing may comprise, for example, implementing a protocol stack of one or more communication standards (e.g., IEEE 802.3 and/or IEEE 802.11), re-modulating the data stream(s) onto one or more RF carriers (e.g., in accordance with DVB-S, ATSC, or some other standard), and/or any other processing necessary for formatting and communicating the data stream(s) in a manner supported by the indoor unit(s). In block 520, the data stream(s) may be transmitted to the indoor unit(s) via a coaxial cable and/or wirelessly, for example.

Figure 6:
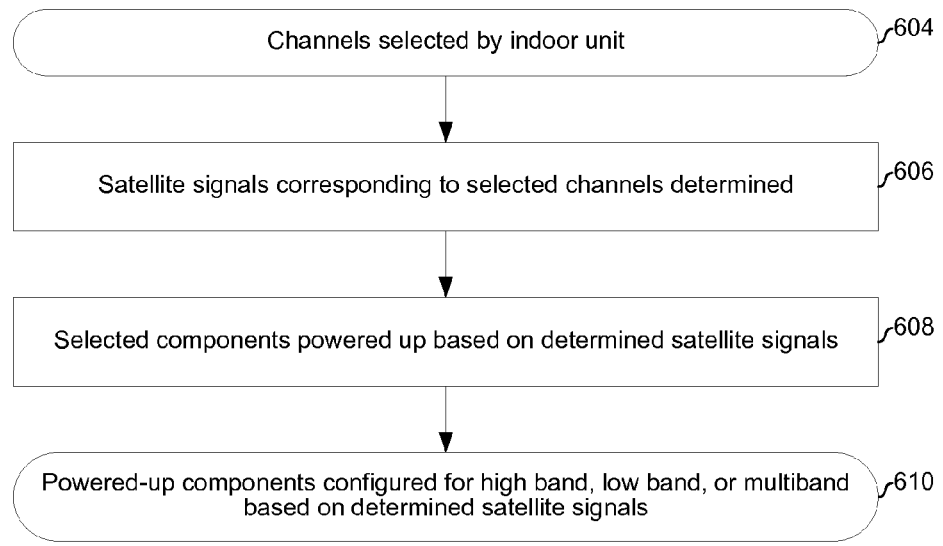
FIG. 6 is a flowchart depicting an example process of a configurable, highly-integrated satellite receiver.

FIG. 6 is a flowchart depicting an example process of a configurable, highly-integrated satellite receiver. The process of FIG. 6 may be performed, for example, as part of block(s) 502 and/or 504 of FIG. 5. The process begins with block 604 when a plurality of channels is selected by the indoor unit. For example, four tuners of the indoor unit may select four channels to be recorded at the current time. In block 606, it is determined which satellite bands and/or polarizations correspond to the four selected channels. In block 608, the subsystems 400 and 401 are configured based on which satellite bands and/or polarizations are to be received by the satellite reception assembly 412 in order to provide the four selected channels to the indoor unit via the medium 308.

In block 610, the subsystem 400 and 401 are configured to capture all the necessary satellite bands/polarizations. Which receive chains are selected for processing which satellite bands/polarizations may be determined based on energy consumption considerations, for example. For example, assuming each of the four channels is on one of low band 1, high band 1, low band 2, and high band 2, there are at least three configurations possible. In a first configuration, each of four receive paths in the satellite reception assembly may be configured to process one of the four bands. In a second configuration a first receive chain may be configured to process low band 1 and high band 1, a second chain may be configured to processes low band 2, and a third chain may be configured to process high band 2. In a third configuration a first receive chain may be configured to process low band 1 and high band 1, a second chain may be configured to processes low band 2 and high band 2.

A direct broadcast satellite (DBS) and/or Fixed Satellite Service (FSS) reception assembly may comprise an integrated circuit (e.g., subsystem 200) that is configurable among a plurality of configurations based on content requested by client devices served by the DBS/FSS reception assembly. In a first configuration, multiple satellite frequency bands may be digitized by the integrated circuit as a single wideband signal (e.g., a single signal output by amplifier $104_1$ or the combined outputs of amplifiers $156_1$ and $158_1$). In a second configuration, the satellite frequency bands may be digitized by the integrated circuit as a plurality of separate narrowband signals (e.g., as outputs of multiple amplifiers $104_1$-$104_X$, where X is an integer).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform processes described herein.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out processes described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
an integrated circuit for use in a direct broadcast satellite (DBS) and/or Fixed Satellite Service (FSS) reception assembly, the integrated circuit residing on a single silicon die and comprising a receive chain including a mixer, a filter, and an analog-to-digital converter (ADC), wherein:
in a first configuration of said integrated circuit, said mixer and said filter are configured to direct down-convert a first narrow satellite frequency band for digitization by said ADC;
in a second configuration of said integrated circuit, said mixer and said filter are configured to direct down-convert a second narrow satellite frequency band for digitization by said ADC;
in a third configuration of said integrated circuit, said mixer and said filter are configured to direct down-convert said first narrow satellite frequency band and said second narrow satellite frequency band as a single wideband signal for digitization by said ADC; and
configuration among said first configuration, said second configuration, and said third configuration is controlled by a control signal generated by control logic of said integrated circuit based on content requested by client devices served by said DBS reception assembly.

2. The system of claim 1, wherein said first narrow satellite frequency band and second narrow satellite frequency band comprise a low band and a high band in the X-band and/or Ku-band.

3. The system of claim 2, wherein:
said low band is from approximately 10.7 GHz to approximately 11.7 GHz; and
said high band is from approximately 11.7 GHz to approximately 12.75 GHz.

4. The system of claim 1, wherein said first narrow satellite frequency band and said second narrow satellite frequency band are in the Ka-band.

5. The system of claim 4, wherein said first narrow satellite frequency band and second narrow satellite frequency band satellite bands comprise two or more of:
a band from approximately 17.3 GHz to approximately 18.8 GHz;
a band from approximately 18.3 GHz to approximately 18.8 GHz; and
a band from approximately 19.7 GHz to approximately 20.2 GHz.

6. The system of claim 1, wherein:
in said first configuration of said integrated circuit, an input of said receive chain is an output of a single off-chip low noise amplifier;
in said second configuration of said integrated circuit, said input of said receive chain is an output of a single off-chip low noise amplifier; and in said third configuration of said integrated circuit, said input of said receive chain is a combined output of a plurality of off-chip low noise amplifiers arranged in parallel.

* * * * *